Figure 1:
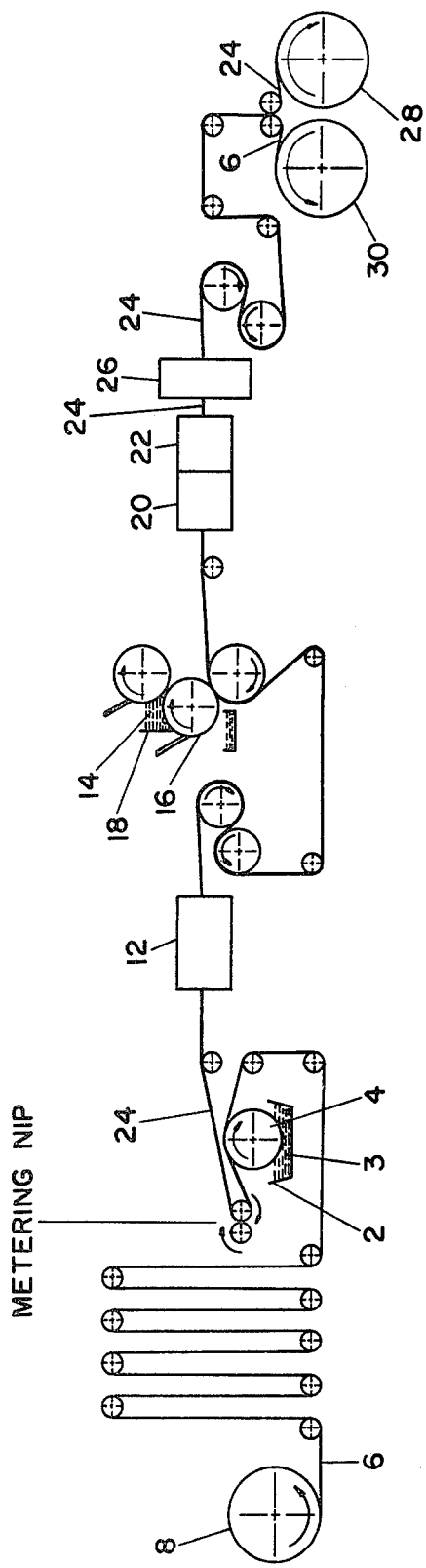

United States Patent [19]

Hill

[11] 4,358,499

[45] Nov. 9, 1982

[54] DIMENSIONALLY STABLE PVC ROOF MEMBRANE

[75] Inventor: Lawrence I. Hill, Toledo, Ohio

[73] Assignee: The General Tire & Rubber Company, Akron, Ohio

[21] Appl. No.: 217,738

[22] Filed: Dec. 18, 1980

[51] Int. Cl.³ .................... B32B 27/08; B44D 1/44
[52] U.S. Cl. ................................ 428/220; 428/520; 428/522; 428/907; 427/411; 264/255; 264/DIG. 60; 156/246
[58] Field of Search ............. 428/213, 220, 518, 520, 428/522; 156/246; 427/411; 264/255, DIG. 60

[56] References Cited

U.S. PATENT DOCUMENTS

| 3,224,894 | 12/1965 | Palmer | 428/159 |
| 3,252,851 | 5/1966 | Benson | 428/215 |
| 3,297,461 | 1/1967 | Siddall | 428/136 |
| 3,429,732 | 2/1969 | Baitinger, Jr. | 428/913 |
| 3,547,772 | 12/1970 | Schnebelen et al. | 156/305 |

Primary Examiner—P. Ives

[57] ABSTRACT

A PVC roofing membrane cast from a plastisol has less than 1.5% shrinkage when held at 176° F. (80° C.) for six hours and remains flexible at −60° F. (−51° C.). The low shrinkage reduces tensions in the roofing membrane, simplifying the application of the membrane to a roof, and reducing stresses caused by dimensional changes at high service temperatures.

1 Claim, 1 Drawing Figure

DIMENSIONALLY STABLE PVC ROOF MEMBRANE

This invention relates to a dimensionally stable polyvinyl chloride (PVC) roof membrane cast from a plastisol.

The dimensional stability of a flexible PVC roof effects the ability of the roof to follow the contour of a geometrically complex substrate. For example, shrinkage of a PVC sheet laid on a concave substrate and sealed at the edges will cause a pulling away of the PVC sheet from the substrate. If the PVC sheet is laid on a convex substrate, shrinkage will cause a tension buildup and possibly a tearing away of the sheet from the anchoring means or a tearing of the sheet itself. To avoid these problems one prior art remedy has been the use of expensive highly elastomeric polyurethane membrane roofs. Another remedy has been rubber poured-in-place roofs, which bond tightly to substrate. A drawback of the poured-in-place roofs is that the tension is concentrated at the substrate expansion joints, again resulting in cracks. In addition, various mechanical means have been used to compensate for the stress in PVC roofs. In any event, special procedures have been necessary to seal PVC roofs at interruptions in the continuous PVC surface.

The present invention is based upon the discovery that a PVC roofing membrane cast from a PVC plastisol is dimensionally stable. In addition to being dimensionally stable, the roofing membrane of the present invention remains flexible and elastic down to $-60°$ F. ($-52°$ C.). This combination of flexibility and dimensional stability prevents the PVC membrane of the present invention from shrinking at elevated temperatures, and then breaking at seams when it is cold due to the tension generated by its previous shrinkage, and contraction and embrittlement due to the cold.

FIG. 1 is a diagramatic side view of a plastisol casting system used to make the PVC membrane of the present invention.

The PVC membrane is made using the following ingredients here as elsewhere in the specification and claims, phr refers to parts by weight of an ingredient based upon 100 parts by weight of PVC and emulsifier.*

(a) 100 to 83 parts PVC
(b) 0 to 17 phr emulsifier
(c) 55 to 75 phr of plasticizer
(d) 0 to 30 phr of filler
(e) 0 to 30 phr of heat and processing stabilizer
(f) 10 to 30 phr of pigment and UV stabilizer
(g) 0 to 10 phr of additional heat and light stabilizers (optional) in the form of epoxy plasticizers, phosphite chelators, and/or UV stabilizers
(h) 0 to 3 phr of mildew/fungus inhibitor
(i) 0 to 10 phr of a flame retardant and weathering stabilizer (e.g., phosphate)

*parts of PVC + parts of emulsifier = 100 parts

The preferred PVC is a high molecular weight small partical size, emulsion polymerized PVC with good air release properties.

The term PVC includes copolymers with other monomers such as vinyl acetate, acrylonitrile, various acrylic esters and any of the other well-known comonomers. The comonomers can be mixed and can constitute up to about 30% of the PVC polymers. The level and type of emulsifiers used during the polymerization of the PVC should be such that it does not adversely affect air release, thus reducing pin holes, or adversely affect the ability to adhesive or solvent weld the PVC membrane. The preferred PVC's have a Relative Viscosity of greater than 2.65, an Inherent Viscosity of greater than 1.18, a Weight Average Molecular Weight greater than 240,000 and a Number Average Molecular Weight greater than 75,000. Mixtures of PVC with other polymers can also be employed.

The plasticizers which can be employed are preferably monomeric plasticizers but can include internal plasticizers such as polyvinyl chloride which is chemically combined with a material which plasticizes the formulation. The plasticizers which can be used in plastisols are well-known and will not be described in detail here. The preferred plasticizers for best outdoor performance are dialkyl phthalates. These phthalates include the octyl, nonyl and decyl phthalates and mixed dialkyl phthalates. The preferred level of the plasticizer is from 60 to 70 phr, although 55 to 75 phr can be used. The plasticizer wets the PVC particles to form a flowable mixture known as a plastisol.

A filler is also employed at a level of from 0 to 30 phr and preferably from 10 to 20 phr parts. Fillers are also well-known in the PVC art and will not be described in detail. The preferred filler is precipitated calcium carbonate. The term calcium carbonate also includes ground limestone. The preferred ground limestone is water ground because of the finer particle size.

Heat and processing stabilizers which also enhance long-term aging because they also act as UV stabilizers are also optionally present at a level of from 0 to 5 phr. These materials are also well-known in the art and are exemplified by barium, cadmium, zinc or barium carboxylated phosphites. These materials are acceptors for hydrochloric acid created by chain scission of the PVC when exposed to degradative effects of heat and light. These materials are preferably present at a level from 1 to 3 phr.

The term PVC includes copolymers with other monomers such as vinyl acetate, acrylonitrile, various acrylic esters and any of the other well-known comonomers. The comonomers can constitute up to about 30% of the PVC polymers.

A pigment is present at a level of from 10 to 30 phr and is preferably present at a level of from 12 to 17 phr. Any of the pigments well-known in the art can be employed but the preferred pigment is titanium dioxide, second preference is zinc oxide. As is common with other pigments, titanium dioxide stabilizes the PVC against ultraviolet degradation.

An improvement in stability during outdoor exposure can be optionally obtained by the additional use of epoxy plasticizers, phosphite chleators, and/or UV absorbers at a level of from 0.1 to 10 phr and preferably employed at a level from about 1 to 5 phr. The preferred epoxy plasticizer is epoxidized soybean oil. The preferred UV absorber is 2-(2'hydroxyphenyl) benzotriazoles.

Fungus inhibitors are also preferably present at a level from about 1 to 5 phr. Any of the well-known fungus inhibitors can be employed, with the preferred materials being the 10,10'-oxybisphenoxarsine compounds.

The compounding of vinyl polymers is well-known in the art and is discussed, for example, in detail in the Encyclopedia of Polymer Science and Technology, pages 393–434, Volume 14, published by Interscience Publishers, NY, London, Sydney, Toronto (1971).

While many variations of the following specific example were formulated, and will be obvious from the example, the following example is considered the best formulation made.

A plastisol is formulated by a conventional procedure using the following ingredients:

(a) 100 parts of PVC, emulsion polymerized inherent viscosity 1.18; Methanol Extractibles 2.0%
(b) 65 parts of mixed octyl, nonyl and decyl phthalate.
(c) 10 parts water ground calcium carbonate
(d) 4.0 parts of barium-cadmium organic complex heat and processing stabilizer
(e) 10 parts of titanium dioxide pigment
(f) 3 parts of epoxidized soybean oil heat stabilizer/plasticizer
(g) 0.1 parts of an organo arsenic mildew inhibitor 10,10'-oxybisphenoxarsine
(h) 5 parts of isodecyl, diphenyl phosphate plasticizer.

The ingredients are thoroughly mixed to form a plastisol and then formed into a roofing membrane utilizing the system shown in FIG. 1.

FIG. 1 shows a plastisol casting system for a roofing membrane comprising in its basic design a plastisol dispensing reservoir 2 which feeds plastisol 3 to roller coater 4. Roller coater 4 applies plastisol 3 to release paper 6 which is continusouly fed to the plastisol casting system from roller 8. The release paper 6 coated with plastisol 3 flows through gelling oven 12 where it is gelled but not fused. A second layer of plastisol 14 is applied on top of the first layer of gelled plastisol 3 by roller coater 16 which is fed from the plasticizer reservoir dispenser 18. The release paper containing the two layers of plastisol then pass through the second gelling oven 20 where the second layer of plastisol is gelled. The two gelled layers on the release paper then pass through a fusion oven 22. Where the plastisol layers are individually fused and fused to each other they form membrane 24. After passing through the cooling zone 26 the PVC membrane 24 is wound-up on take-off roller 28 and the release paper is wound-up on take-off roller 30 for reuse.

The reason that two plastisol layers are applied to the release sheet instead of one is to eliminate pin holes which pass completely through the PVC membrane. If a pin hole were to form in one plastisol layer it is highly unlikely that it would mate with a pin hole in an adjacent plastisol layer. The fusion of the two layers causes an extremely strong bond to form between the two layers. For all practical purposes the membrane can be considered as one single layer and the two layers can no longer be delaminated. In addition, the process is price competitive with laminating two calendered sheets, forms a tighter bond than calendering and does not result in dimensional instability due to an elastic at elevated temperatures memory such as that generated in the calendering/laminating procedure.

| Physical Properties of the PVC Roofing Membrane of Example I are: | | | |
|---|---|---|---|
| Property | Test Method | Typical Value | Metric Equivalent |
| Thickness | | 45 +/− 2 mils | 1.14 ± 0.05 mm |
| Weight | | .3 lbs/sq. ft. | 1.465 kg/m$^2$ |
| Roll Size | | 6 × 75 ft. | 1.83 × 22.86 m |
| Roll Weight | | 150 lbs. | 68.04 kg |
| Color | | Gray/Black | |
| Tensile | ASTM D-882 | | |
| (A) before aging | | 1800 psi | 12.4 MPa |
| (B) 7 days @ 200° F./(93° C.) | | 1920 psi | 13.2 MPa |
| (C) 7 days @ 240° F./(115° C.) | | 2100 psi | 14.5 MPa |
| (D) 2500 hr. carbon arc weatherometer | | 1850 psi | 12.7 MPa |
| 100% Modulus | ASTM D-882 | | |
| (A) before aging | | 875 psi | 6.0 MPa |
| (B) 7 days @ 200° F./(93° C.) | | 900 psi | 6.2 MPa |
| (C) 7 days @ 240° F./(115° C.) | | 1140 psi | 7.9 MPa |
| (D) 2500 hr. carbon arc weatherometer | | 1000 psi | 6.9 MPa |
| Elongation | ASTM D-882 | | |
| (A) before aging | | 300% | 300% |
| (B) 7 days @ 200° F./(93° C.) | | 340% | 340% |
| (C) 7 days @ 240° F./(115° C.) | | 300% | 300% |
| (D) 2500 hr. carbon arc weatherometer | | 325% | 325% |

| Physical Properties of the PVC Roofing Membrane of Example I are: (cont'd) | | | |
|---|---|---|---|
| Property | Test Method | Typical Value | Metric Equivalents |
| Graves Tear | ASTM D-1004 | | |
| (A) before aging | | 285 lbs./in. | 50.9 kg/cm |
| (B) 7 days @ 200° F./(93° C.) | | 290 lbs./in. | 51.8 kg/cm |
| (C) 7 days @ 240° F./(115° C.) | | 290 lbs./in. | 51.8 kg/cm |
| (D) 2500 hr. carbon arc weatherometer | | 325 lbs./in. | 58.0 kg/cm |
| Dimensional Stability | ASTM D-1204 | | |
| (6 hrs. oven age @ 170° F./(80° C.) | | 1% max. | 1% max |
| Activated Carbon Volatility | ASTM D-1203 | | |
| (1% loss 170° F./80° C. for 24 hrs.) | | 1% max. | 1% max |
| Puncture Resistance | ASTM D-1916 | 200 lbs. min. | 90.7 kg. min |
| Low Temperature Resistance | ASTM D-2136 | −60° F. | −51° C. |

| Physical Properties of the PVC Roofing Membrane of Example I are: (cont'd) | | | |
|---|---|---|---|
| Property | Test Method | Typical Value | Metric Equivalents |
| (¼ in. mandrel) Shore "A" Hardness Durometer | | 85 | 85 |

Comparison studies with competitive PVC roofing membranes showed that at 176° F. competitive membranes shrank from 2.3 to 4.7% in the machine direction. Membranes of the present invention had an average shrinkage of less than 1% in either the machine direction or cross machine direction.

One advantage of the low shrink of the PVC membrane of the present invention is that the membrane can be installed over the edge of a roof without undue stress on the seam formed adjacent to the roof lines. The prior art PVC membranes terminate at the roof line and are overlapped with a flashing piece to present a seam at the most vulnerable part of the roof. The PVC roofing membrane can be applied by known roofing techniques.

I claim:

1. In a PVC roofing membrane having a thickness of from 20 to 80 mils, the membrane consisting essentially of:
    (a) 100 parts of PVC
    (b) 55 to 75 parts of plasticizer
    (c) 0.1 to 10 parts of emulsifier
    (d) 1 to 30 parts of filler
    (e) 1 to 30 parts of heat and processing stabilizer; and
    (f) 1 to 30 parts of UV stabilizer,
the improvement comprising the membrane being formed by casting and gelling a first layer of plastisol, then casting and gelling a second layer of plastisol on top of the first layer, then fusing both layers to produce a membrane which is elastic and flexible at minus 60° F. and has less than 1.5% shrinkage at 175° F. for six hours.

* * * * *